United States Patent [19]

Iceland et al.

[11] Patent Number: 5,045,667
[45] Date of Patent: Sep. 3, 1991

[54] MANUAL KEYHOLE PLASMA ARC WELDING SYSTEM

[75] Inventors: William F. Iceland, Los Alamitos; Charles D. Rosen, Huntington Beach, both of Calif.

[73] Assignee: Rockwell International Corporation, El Segundo, Calif.

[21] Appl. No.: 534,572

[22] Filed: Jun. 6, 1990

[51] Int. Cl.⁵ .................................................. B23K 9/00
[52] U.S. Cl. .............................. 219/121.54; 219/121.5; 219/121.52; 219/121.49; 219/121.45
[58] Field of Search ....................... 219/121.37, 121.45, 219/121.46, 121.48, 121.5, 121.52, 121.54, 121.57, 75

[56] References Cited

U.S. PATENT DOCUMENTS

| | | | |
|---|---|---|---|
| 3,250,893 | 5/1966 | Nestor | 219/121.46 |
| 3,278,720 | 10/1966 | Dixon | 219/121.46 |
| 3,832,513 | 8/1974 | Klasson | 219/121.46 |
| 4,833,294 | 5/1989 | Montaser et al. | 219/121.49 |

Primary Examiner—M. H. Paschall
Attorney, Agent, or Firm—Lawrence N. Ginsberg; Charles T. Silberberg

[57] ABSTRACT

A manual keyhole plasma arc welding system including a power source; a manual arc welding torch assembly which includes, a) a hollow shield cup, b) a orifice subassembly concentrically disposed within the shield cup, and c) an electrode concentrically disposed within the orifice subassembly; a shield gas source; and a plasma gas source. A shield gas discharge annulus is formed between a terminal edge of the shield cup and the terminal end of the orifice subassembly. The terminal edge of the shield cup is extended beyond the terminal end of the orifice subassembly to produce a laminar shield gas discharge flow through the discharge annulus, providing cooling of the orifice subassembly. A plasma gas discharge annulus is formed between the terminal end of the orifice subassembly and a terminus of the electrode. A first terminal of the power source is connected to the electrode and a second terminal of the power source is connected to the workpiece. The power source provides a sinewave alternating current. A transferred arc is formed between the electrode and the workpiece. The power density is sufficient to provide keyhole welding, the reversing sinewave polarities providing simultaneous keyhole penetration and cathodic cleaning, eliminating the requirement of substantial workpiece surface preparation and/or removal of internal workpiece defects.

9 Claims, 1 Drawing Sheet

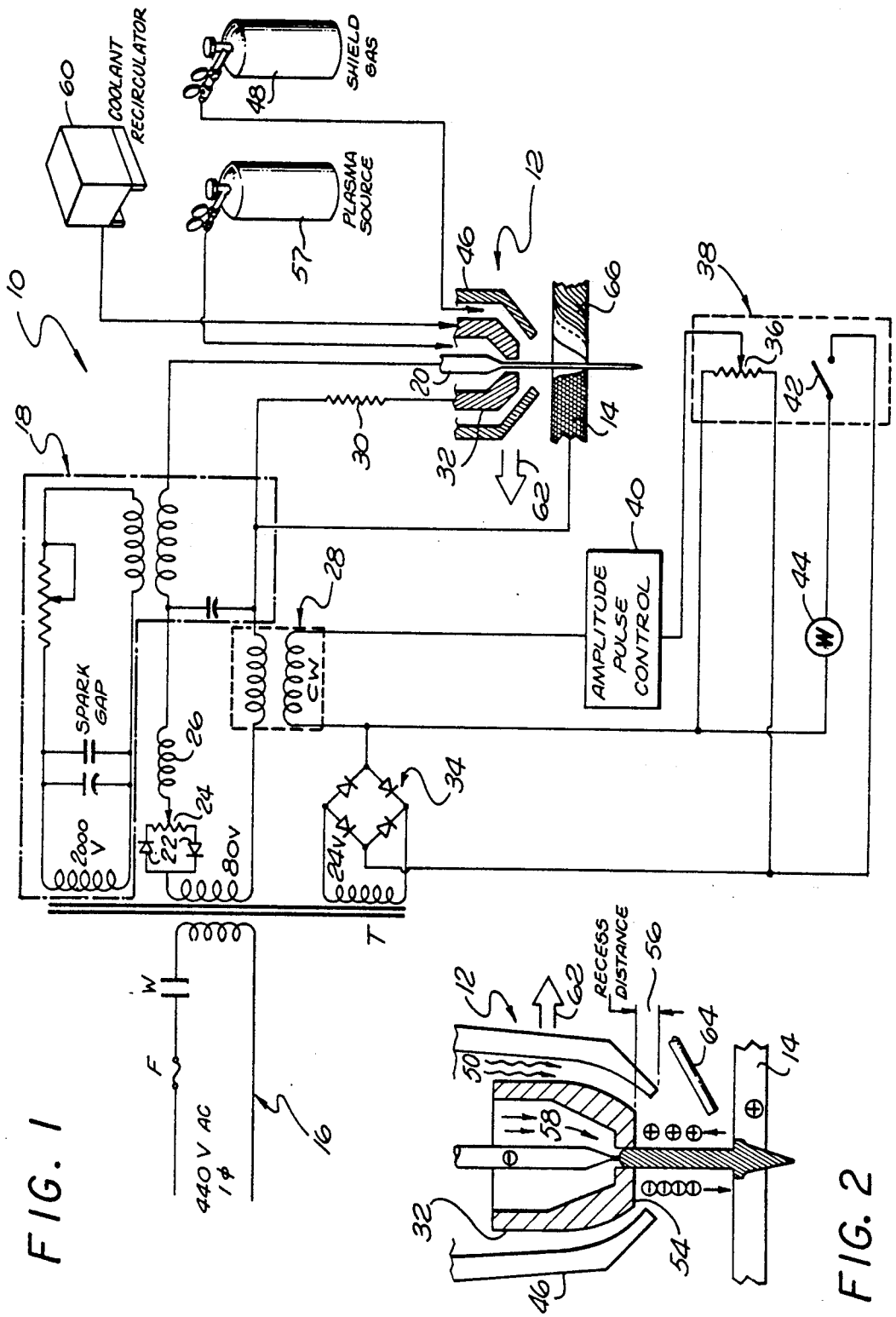

MANUAL KEYHOLE PLASMA ARC WELDING SYSTEM

BACKGROUND OF THE INVENTION

1. Field of the Invention

This invention relates to high powered density welding and more particularly to a manual keyhole welding process for eliminating defects in weldable material.

2. Description of the Related Art

Typically, during the manufacturing of large aluminum and other weldable structures automatic welding techniques are utilized to form the basic structure. Manual welding techniques are later used to repair undesirable defects generated during the automated welding process. The defects are usually detected by X-ray techniques or visual inspection and removed by mechanical means such as grinding or machining. The structure is then re-melted or repair welded using gas tungsten arc welding (GTAW) or plasma arc welding techniques.

GTAW produces an arc between a non-consumable electrode and the workpiece, in an inert gas atmosphere. A gas discharge is formed as a result of the ionization of the gas. GTAW is generally conducted in a power density range of between approximately $5 \times 10^6$ W/mm$^2$ and $5 \times 10^8$ W/mm$^2$ to provide melting of the workpiece. Plasma arc welding techniques involve gas discharged through a constricted orifice resulting in a collimated, high velocity, high temperature discharge. Plasma arc welding is generally conducted in a power density range of between $5 \times 10^8$ W/mm$^2$ and $3 \times 10^{10}$ W/mm$^2$.

At levels greater than about $1 \times 10^{10}$ W/mm$^2$ the power density is sufficiently high during the plasma arc welding to not only merely melt but also to completely penetrate the structure to form a hole or "keyhole", as it is commonly called. This technique is described in the book entitled "Physics of Welding", Chapter 8, High Power Density Welding. Keyhole welding provides deep, narrow penetration as compared to the GTAW process.

U.S. Pat. No. 4,628,177, entitled "Arc Welding Torch", issued to W. R. Dempsey et al discloses a sealless plasma arc welding torch which uses a power source having a square time-based control wave form. Dempsey used a shield gas which may be helium.

OBJECTS AND SUMMARY OF THE INVENTION

It is therefore a principle object of the present invention to eliminate the grinding or machining techniques presently required to repair undesirable defects generated during automated welding processes.

It is another object to improve keyhole arc welding systems.

The present invention is a manual keyhole plasma arc welding system. In its broadest aspects, it includes:
  (a) a power source;
  (b) a manual arc welding torch assembly which includes:
    (i) a hollow shield cup,
    (ii) an orifice subassembly concentrically disposed within the shield cup, and
    (iii) an electrode concentrically disposed within the orifice subassembly.
  (c) a shield gas source; and
  (d) a plasma gas source.

A shield gas discharge annulus is formed between a terminal edge of the shield cup and the terminal end of the orifice subassembly. The terminal edge of the shield cup is extended beyond the terminal end of the orifice subassembly to produce a laminar shield gas discharge flow through the discharge annulus, providing cooling of the orifice subassembly. A plasma gas discharge annulus is formed between the terminal end of the orifice subassembly and a terminus of the electrode. A first terminal of the power source is connected to the electrode and a second terminal of the power source is connected to the workpiece. The power source provides a sinewave alternating current. A transferred arc is formed between the electrode and the workpiece. The power density is sufficient to provide keyhole welding, the reversing sinewave polarities providing simultaneous keyhole penetration and cathodic cleaning, eliminating the requirement of substantial workpiece surface preparation and/or removal of internal workpiece defects. Both the shield gas and the plasma gas are inert gases. The shield gas is preferably helium.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration of the AC plasma arc manual keyhole welding system of the present invention.

FIG. 2 is an enlarged schematic illustration of the manual plasma arc welding torch assembly shown in FIG. 1.

The same elements or parts throughout the Figures of the drawings are designated by the same reference characters.

DETAILED DESCRIPTION OF THE PREFERRED EMBODIMENT

Referring to the drawings and characters of reference marked thereon, FIG. 1 illustrates a preferred embodiment of the present invention, designated generally as 10. A manual plasma arc welding torch assembly 12, described in detail below, is provided for the keyhole plasma arc welding of a workpiece 14. A drooping or constant current characteristic power supply 16, preferably with 440 volt single phase AC is provided. The open circuit voltage of the power supply 16 is nominally at 80 volts AC. A high frequency oscillator, designated with dashed lines 18, preferably of the spark gap type, is provided for arc initiation without a requirement that the electrode 20 of the torch assembly 12 touch the work surface of the workpiece 14. The oscillator 18 provides the requisite amplitude and time period for a transferred arc from the electrode 20 to the workpiece. Additionally, the oscillator 18 provides for arc re-ignition during straight and reverse polarities to prevent arc outages. The 440 volt volts are stepped up to a nominal 2,000 volts AC, as indicated in this Figure.

The voltage from the power supply 16 is stepped down through the transformer T, applied across two diodes 22, through a balancing potentiometer 24 and through the inductor 26. Potentiometer 24 provides balancing control of the sinewave current wave shape. The balancing effect provides for control of weld penetration compared to weld cleaning action. The 80 volts impressed across the electrode 20 and workpiece 14 through the high frequency oscillator 18. A saturable reactor, designated with dashed lines 28, is provided to control the current of the power supply 16. A pilot arc resistor 30 provides a high frequency path between the electrode 20 and a orifice subassembly 32 of the torch assembly 12, thus providing a high frequency gas discharge for arc initiation.

The 440 volts is stepped down to 24 volts and converted to DC by a bridge rectifier 34. The DC output voltage of the bridge rectifier 34 is impressed across a weld current control potentiometer 36 of a foot switch potentiometer assembly 38, through a pulse amplitude control 40 into the control winding of the saturable reactor 28. (The pulse amplitude control 40 permits out-of-position welding by varying the amplitude and time period of the weld current. This control negates gravity effects by preventing sag or fall out of the weld puddle.) As the operator varies the foot switch, the current through the control winding of the saturable reactor 28 changes the output current of the welder. Weld operation can be initiated through use of the on-/off switch 4 through the weld contactor 44.

Referring now to FIG. 2, an enlarged illustration of the plasma arc welding torch assembly 12 is provided. Assembly 12 includes a hollow shield cup 46, a orifice subassembly 32 concentrically disposed within the shield cup 46, and an electrode 20 (preferably formed of thoriated tungsten) concentrically disposed within the orifice subassembly 32. A shield gas source 48 (see FIG. 1) supplies a flow of shield gas 50 through a shield gas discharge annulus formed between the terminal edge 52 of the shield cup 46 and the terminal end 54 of the orifice subassembly 32. The terminal edge 52 of the shield cup 46 is extended beyond the terminal end 54 of the hollow orifice subassembly 32 and constructed with a recess distance (designated by arrows 56) sufficient to produce a laminar shield gas discharge flow through the discharge annulus, providing cooling of the orifice subassembly 32. The shield gas 50 is an inert gas, preferably helium or a gas mixture of helium and another inert gas.

A plasma gas source (designated 57 in FIG. 1) provides a flow 58 of an inert plasma gas through a plasma gas discharge annulus formed between the electrode 20 and the terminal end 54 of the orifice subassembly 32. The plasma gas is an inert gas, preferably argon. Water cooling is provided to cool the orifice subassembly 32, as is well known in the art. A coolant recirculator is schematically illustrated as 60 in FIG. 1.

During operation, with the torch in hand, the welder actuates the foot switch assembly 38. Plasma gas, shield gas, and torch cooling water are flowing. The high frequency pilot arc is initiated and the operator approaches the surface to be welded. The pilot arc is established by gas ionization. The high frequency arc is transferred to the work surface. The pilot arc is automatically extinguished. The welding arc is established and welding current is generated. The operator holds position until a keyhole is formed. The torch is moved above the surface to be welded, forming a continuous weld. With AC welding, penetration of the work is predominantly maintained by straight polarity (electrode negative). As during the reverse polarity portion of the cycle (electrode positive), heavy ions bombard the entire portion of the keyhole surface. This cathodically clears the complete keyhole area and all undesirable defects are dispelled by the gas pressure, the defects being removed through the drop-through side of the keyhole.

In FIG. 2, the electrode negative condition (i.e. straight polarity) is illustrated. (The torch assembly 12 is being moved in the direction of arrow 62, a filler wire 64 being positioned ahead of the torch assembly 12.) The electrode is in a negative condition and the workpiece is in a positive condition. The electrons are attracted to the work surface, generating a high temperature condition. The positive ions are attracted to the electrode. At the reverse polarity (not illustrated) the electrons are attracted to the electrode and the heavy positive ions bombard the keyhole providing the aforementioned cleaning, resulting in a defect-free weld. In FIG. 1, the metal 66 is shown solidifying behind the keyhole. To provide keyhole plasma arc welding, the power density should be at or above $1 \times 10^{10}$ W/mm$^2$.

Laminar shield gas flow is insured by recessing the terminal end 54 of the orifice subassembly 32 with respect to the terminal edge 52 of the shield cup 46. In one constructed embodiment, the outside diameter of the main body of the shield cup 46 is approximately ⅜ inch with a terminal edge 52 diameter of approximately ⅜ inch. The orifice subassembly 32 has a main body outside diameter of approximately ½ inch which is tapered at the terminal end 54 to approximately ¼ inch. The recessed distance 56, between the terminal edge 52 and terminal end 54 is approximately 0.15 inches. This miniaturization of design allows for manual use of the present invention.

The present invention obviates any requirement of grinding or machining which is normally required to remove defects before re-welding. Furthermore, the removal of surface oxides, normally a prerequisite for defect-free x-ray quality welds, is obviated. The present invention is very useful with welding applications involving aluminum.

Obviously, many modifications and variations of the present invention are possible in light of the above teachings. It is, therefore, to be understood that, within the scope of the appended claims, the invention may be practiced otherwise, than as specifically described. For example, although the invention has been discussed with respect to its use in repairs it may be used as a primary welding tool.

What is claimed is:

1. A manual key hole plasma arc welding system, comprising:
   (a) a power source for providing a sinewave alternating current;
   (b) a manual plasma arc welding torch assembly, including,
      (i) a shield cup having a terminal edge having a centrally disposed longitudinal axis,
      (ii) a orifice subassembly concentrically disposed within said shield cup, said orifice subassembly having a terminal end, a shield gas discharge annulus being formed between the terminal edge of the shield cup and the terminal end of the hollow orifice subassembly,
      (iii) an electrode, being connected to a first terminal of said power source, said electrode being concentrically disposed within said orifice subassembly, a plasma gas discharge annulus being formed between the terminal end of the hollow orifice subassembly and a terminus of said electrode,
   said terminal edge of the shield cup being extended beyond the terminal end of the orifice subassembly and so constructed to produce a laminar shield gas discharge flow through said discharge annulus providing cooling of the orifice subassembly;

(c) a shield gas source in fluid communication with said shield gas discharge annulus, for providing a flow of an inert shield gas through said shield gas discharge annulus to said workpiece;

(d) a plasma gas source in fluid communication with said plasma gas discharge annulus, for providing a flow of inert plasma gas through said plasma gas discharge annulus, said flow being substantially collimated;

a second terminal of said power source being connected to the workpiece so as to provide a transferred arc between said electrode and said workpiece, the power density being sufficient to provide keyhole welding, the reversing sinewave polarities providing simultaneous keyhole penetration and cathodic cleaning eliminating the requirement of substantial workpiece surface preparation and/or removal of internal workpiece defects.

2. The welding system of claim 1 wherein said shield gas is helium.

3. The welding system of claim 1 wherein said shield gas includes a gas mixture including helium.

4. The welding system of claim 1 wherein said plasma gas is argon.

5. The welding system of claim 1 wherein said power source includes control means for providing relative penetration and cleaning control.

6. The welding system of claim 1 wherein said power density is greater than or equal to $1 \times 10^{10} W/m^2$.

7. The welding system of claim 1 wherein said workpiece is formed of aluminum.

8. The welding system of claim 1 wherein said sinewave alternating current is balanced.

9. The welding system of claim 1 wherein said sinewave alternating current is unbalanced.

* * * * *

UNITED STATES PATENT AND TRADEMARK OFFICE
CERTIFICATE OF CORRECTION

PATENT NO. : 5,045,667

DATED : Sep. 3, 1991

INVENTOR(S) : William F. Iceland et al.

It is certified that error appears in the above-identified patent and that said Letters Patent is hereby corrected as shown below:

On Title page, Item [75] after "Beach" add --Jerry R. Tryon, Anaheim, CA; Alfonso Z. Aguila, Paramount, CA.--.

Signed and Sealed this

Fifteenth Day of December, 1992

*Attest:*

DOUGLAS B. COMER

*Attesting Officer*      *Acting Commissioner of Patents and Trademarks*